H. E. SHAWVER.
PRESSURE REGULATOR.
APPLICATION FILED SEPT. 3, 1908. RENEWED MAY 23, 1912.
1,042,980.
Patented Oct. 29, 1912.
3 SHEETS—SHEET 1.
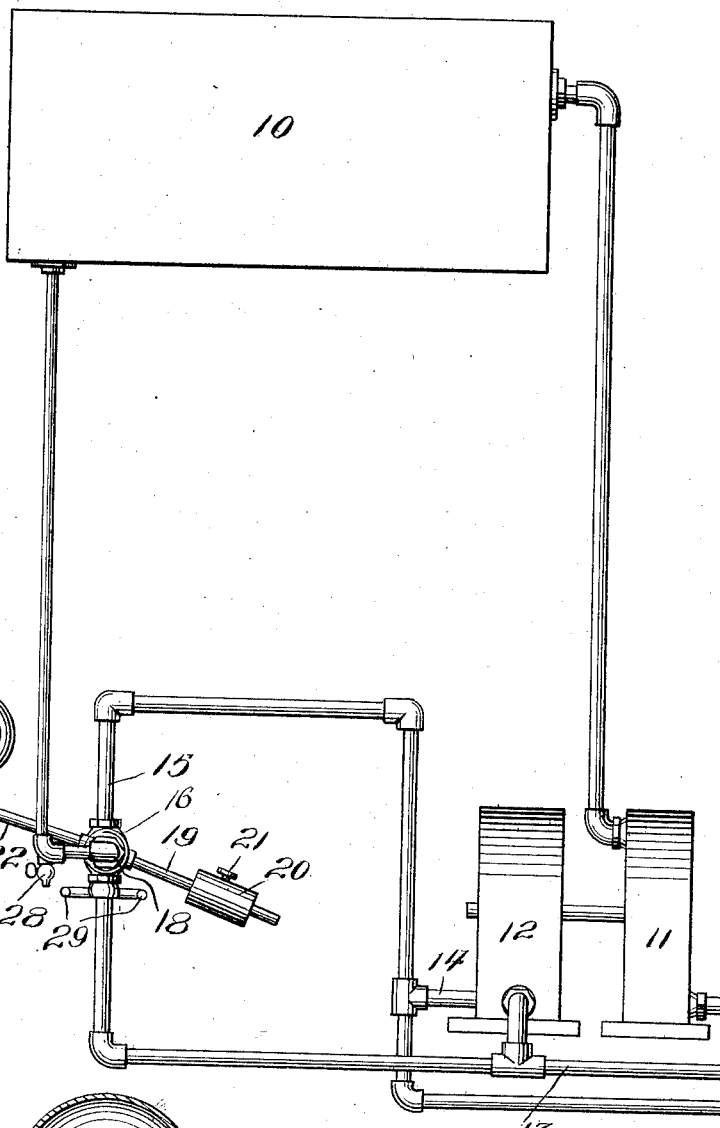
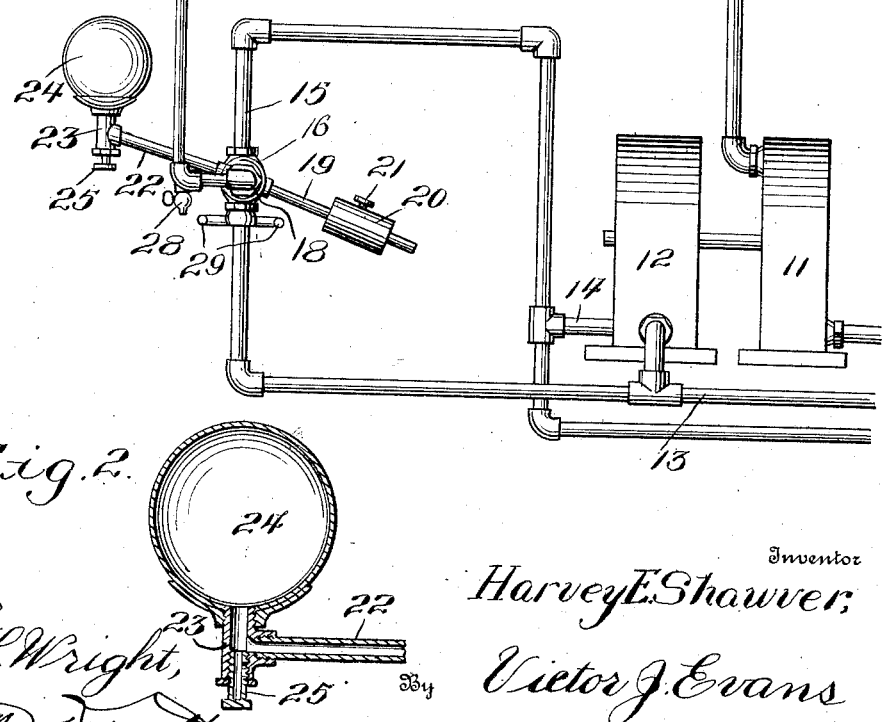
Witnesses
J. T. L. Wright
Wm. J. Toerth
Inventor
Harvey E. Shawver;
By Victor J. Evans
Attorney

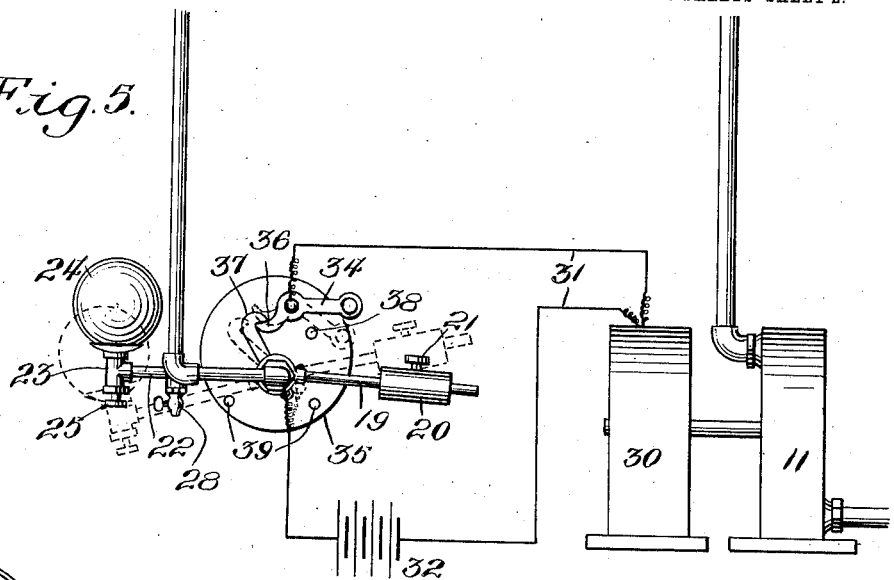
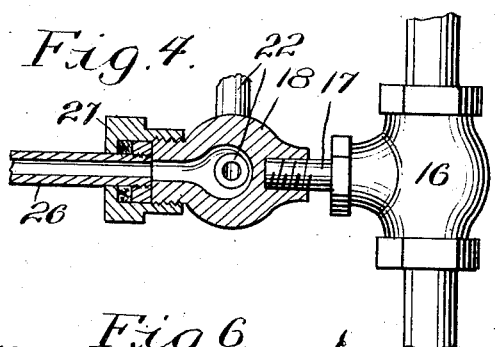
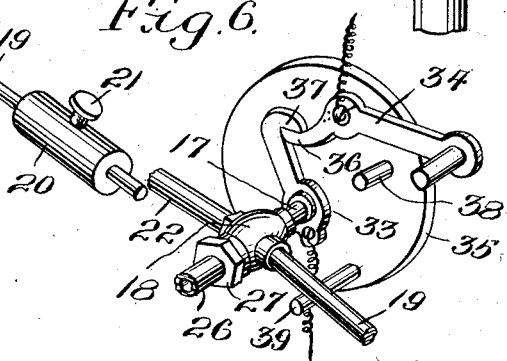

H. E. SHAWVER.
PRESSURE REGULATOR.
APPLICATION FILED SEPT. 3, 1908. RENEWED MAY 23, 1912.
1,042,980.
Patented Oct. 29, 1912.
3 SHEETS—SHEET 3.
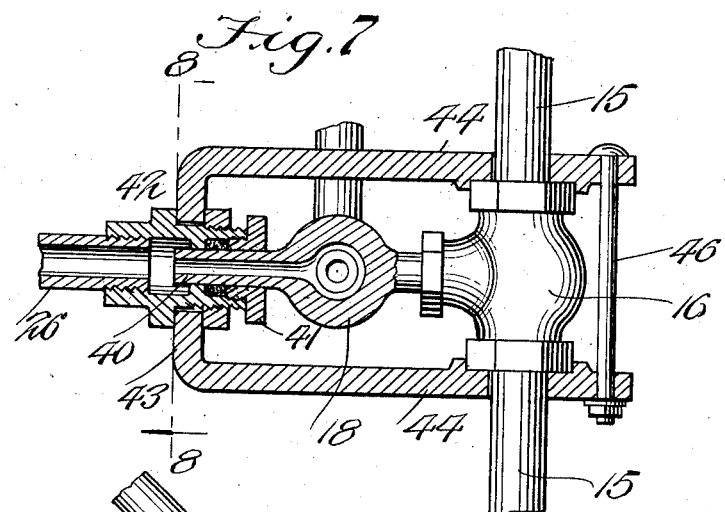
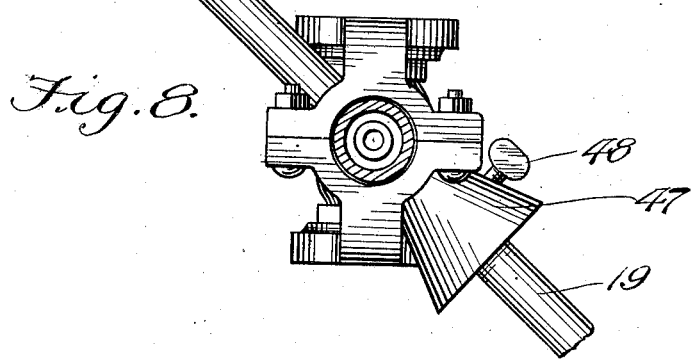
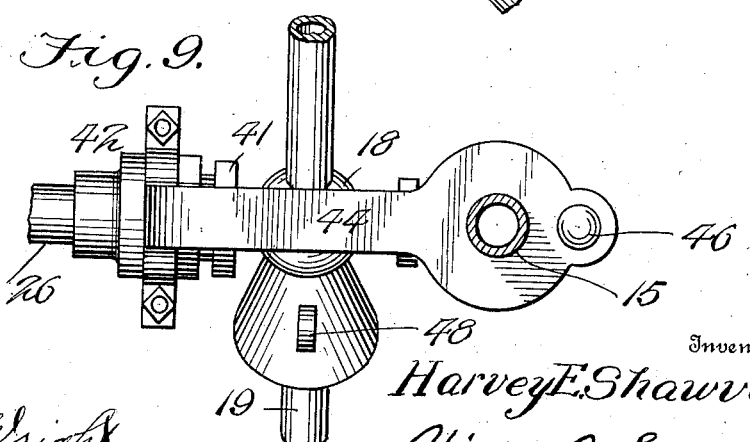
Inventor
Harvey E. Shawver,
By Victor J. Evans,
Attorney
Witnesses

UNITED STATES PATENT OFFICE.

HARVEY E. SHAWVER, OF LEWISTOWN, ILLINOIS.

PRESSURE-REGULATOR.

1,042,980.      Specification of Letters Patent.      Patented Oct. 29, 1912.

Application filed September 3, 1908, Serial No. 451,604. Renewed May 23, 1912. Serial No. 699,284.

*To all whom it may concern:*

Be it known that I, HARVEY E. SHAWVER, a citizen of the United States, residing at Lewistown, in the county of Fulton and State of Illinois, have invented new and useful Improvements in Pressure-Regulators, of which the following is a specification.

This invention relates to pressure regulators, and more particularly one for pneumatic water supply systems. In such systems the water is pumped into a closed tank known as the pressure tank, and as it rises in said tank the air therein is compressed and thus utilized to force the water to its destination.

The object of the present invention is to provide improved means for automatically maintaining a predetermined pressure in the pressure tank, and to this end the invention consists in a mechanism for stopping the pump when the pressure rises above a certain point, and for starting the pump when the pressure drops below the same.

In the accompanying drawings, Figure 1 is an elevation of the invention. Fig. 2 is a sectional view of the globe hereinafter referred to. Fig. 3 is a detail in perspective. Fig. 4 is a sectional detail. Fig. 5 is a diagrammatic elevation of a modified form of regulator. Fig. 6 is a detail in perspective of a portion of the mechanism shown in Fig. 5. Fig. 7 is a vertical transverse sectional view through the valve controlling mechanism, illustrating means for supporting the same. Fig. 8 is a vertical section on the line 8—8 of Fig. 7, showing means which may be employed for limiting the movement of the swinging arms 19 and 22. Fig. 9 is a top plan view of the device illustrated in Fig. 8.

Referring specifically to the drawings, 10 designates the pressure water supply tank and 11 the pump for supplying the tank. The pump is operated by a suitable motor, a hydraulic motor 12 being shown, the water for operating the same entering through a pipe 13 and discharging through a pipe 14. These pipes are connected to a by pass 15 containing a valve 16, the arrangement being such that when the valve is open the water flows through the by pass, and when the valve is closed the water flows to the motor and operates the same.

The valve 16 is provided with a projecting stem 17, and to this stem is connected a hollow coupling 18. From one side of the coupling 18 projects a rod 19, which is provided with an adjustably mounted weight 20, the latter being held at adjustment by a set screw 21. From the opposite side of the coupling a pipe 22 projects, and said pipe is adapted to communicate with the interior of the hollow coupling 18. To the extremity of this pipe is connected a coupling 23 which carries a hollow globe 24, the interior of which communicates with the pipe 22. The coupling 23 may be provided with a drain valve 25 as illustrated in Figs. 1, 3 and 5 of the drawings.

The coupling 18 is provided with an additional pipe 26, which in turn communicates with the pressure tank 10. This pipe extends at right angles to the rod 19 and pipe 22 and is in axial alinement with the valve stem 17 so that it may serve as a pivotal support for the casing 18. A suitable stuffing box 27, having a packing is provided to prevent leakage, and the pipe 26 is provided with a suitable air cock 28. On the by pass pipe, below the casing of the valve 16, in the device illustrated in Figs. 1 and 3 of the drawings, are stops 29 for limiting the swing of the rod 19 and pipe 22.

The operation of the apparatus is as follows: The rod 19 and pipe 22 act as a lever, and when the weight 20 overbalances the globe 24, or vice versa, the lever swings and rocks the casing 18, and as the latter is connected with the valve stem 17 the valve 16 is operated by the rocking of the casing. The weight 20 is adjusted on the rod 19 so that it will balance the globe 24 and the weight of the water therein when the desired pressure in the tank 10 is attained. An increase of pressure within the tank causes more water to enter the globe through the pipe 26, coupling 18 and pipe 22, whereby the weight 20 is overbalanced and the lever swings in the direction to open the valve. The water for operating motor then flows through the by pass 15 and the motor ceases to operate. When the pressure in the tank drops below the desired point, the pressure of the air compressed in the globe forces a corresponding amount of water out of it and thereby decreasing the weight of the globe so that it is overbalanced by the weight 20, whereby the lever is caused to swing in the opposite direction and the valve stem 17 is turned to close the valve 16. The water for operating the motor now flows thereto and the pump is started to restore the pressure in the tank.

By the apparatus herein described, it will be noted, the desired pressure will be automatically maintained, and as the apparatus is simple in construction and has no complicated parts to get out of order it is efficient and reliable in operation.

In Figs. 5 and 6 there is shown a modified form of the apparatus designed to be used in connection with an electric motor or internal combustion engine for operating the pump which supplies the pressure tank. In these views the numeral 30 designates an electric motor or internal combustion engine, and 31 are the wires for carrying the current thereto from a suitable source designated by the numeral 32, or said wires may be of the ignition circuit of an internal combustion engine, one of the wires is connected to one of the contacts 33 of a circuit breaker, and the other wire is connected to a second contact 34. The contact 33 is pivoted to a base 35, and is connected to the coupling 18 in such a manner that it will swing therewith when said coupling is rocked by the lever as heretofore described. The contact 34 is also pivoted to the base 35 and is formed with a finger 36 which is engageable by a hook 37 on the contact 33, and when so engaged the circuit is closed. When the parts are disengaged to break the circuit the contact 34 swings downwardly against a stop pin 38 projecting from the base. The base is also provided with stops 39 for limiting the swing of the lever formed by the rod 19 and pipe 22. It is of course to be understood, that the contacts are insulated from each other at their bearings.

The modified form of the apparatus operates as follows: Excessive pressure in the tank causes the lever to tilt as already described, and as it is connected to the contact 33 the hook 37 thereof will swing away from the finger 36 of the contact 34, and the latter swings downwardly against the stop 38, as shown by the dotted lines in Fig. 5, whereby the circuit is opened and the motor or engine stopped. When the pressure drops below the desired point the contact will be brought together manually to close the circuit, whereby the operation of the motor or engine is resumed to actuate the pump.

In Figs. 7, 8 and 9 I have illustrated mechanism for effectively supporting the coupling 18 as well as limiting the swing of the lever. In these figures the coupling 18 is provided with a projecting stem 40, having a central passage communicating with the hollow coupling. This projection 40 is smooth and is adapted for the reception of a packing washer 41. This washer 41 is adapted for engagement with a packing box 42 which in turn is connected with the pipe 26. The packing box 42 is provided with an annular groove or recess, and this recess is adapted for the reception of the right angularly bent or offset members 43 of a pair of bracing arms 44. These bracing arms 44 are each provided with an opening adapted for the reception of the pipes 15 and are also provided with smaller orifices adapted for the reception of a securing element 46 by which the plates or arms 44 are pressed tightly against the valve 16. The offset projecting portions 43 of these plates 44 are each centrally provided with a semi-cylindrical centrally arranged cutaway portion adapted to engage the annular recess of the packing box 42. The offset portions 43 of the plates are also provided with oppositely extending arms, each of which being provided with a suitable alining perforation adapted for the reception of securing members by which the front or face of the members is connected and retained in position within the annular recess of the packing box 42. By this construction it will be noted that the arms or plates 44 effectively support the projecting portions of the operating device while in no way interfering with the movements of the parts.

Slidably mounted upon the rod 19 is a cone faced stop member 47. This member 47 is provided with a suitable thumb screw 48, by which it may be adjustably secured upon the rod 19, and it will be noted that when the member 47 is adjusted upon the rod 19 it will contact with either of the arms or plates 44 as the lever is swung, thereby regulating the throw of the valve 16.

Having thus fully described the invention what is claimed as new is:

1. The combination with a tank, a pump discharging into the tank, a fluid motor for operating the pump, of a pressure regulator, said regulator comprising a bypass communicating with the motor and provided with a valve, a stem upon the valve having a hollow member and a weighted extension, a globe shaped hollow member connected to the hollow member of the stem and provided with a valve, and an outlet pipe connected with the tank and communicating with the hollow member of the stem.

2. In combination with a tank, a pump connected with the tank, and a fluid motor for the pump, of a bypass connected with the inlet pipe of the motor, a valve upon the bypass, a stem upon the valve having a hollow member and a weighted extension, a globe shaped hollow member connected with the hollow member of the stem, a drain valve for the globe shaped hollow member, means for adjusting the weighted extension of the valve stem, and a communication between the tank and the hollow member of the stem, substantially as described.

In testimony whereof I affix my signature in presence of two witnesses.

HARVEY E. SHAWVER.

Witnesses:
R. E. GRIFFITH,
ALMA BORDNER.

Copies of this patent may be obtained for five cents each, by addressing the "Commissioner of Patents, Washington, D. C."